C. L. Campbell.
Fitting Axle Spindles.
No. 95,319.   Patented Sep. 28, 1869.
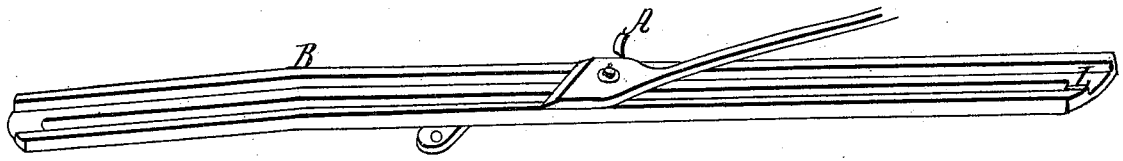
Witnesses:
S. W. Rogers
W. W. Heaton
Inventor,
Cornelius L. Campbell

United States Patent Office.

CORNELIUS L. CAMPBELL, OF BINGHAMTON, NEW YORK, ASSIGNOR TO WASHINGTON W. WHEATON, OF SAME PLACE.

Letters Patent No. 95,319, dated September 28, 1869.

IMPROVEMENT IN DEVICE FOR FITTING AXLE-SPINDLES TO SKEINS.

The Schedule referred to in these Letters Patent and making part of the same.

*To all whom it may concern:*

Be it known that I, CORNELIUS L. CAMPBELL, of Binghamton, in the county of Broome, and State of New York, have invented a new and useful Improvement on a Machine for Fitting Axle-Spindles to Skeins of Wagons, for which I received Letters Patent dated October 9, 1866; and I do hereby declare that the following is a full and exact description of the construction and operation of the same, reference being had to the accompanying drawing, and the letters of reference marked thereon.

The drawing is a perspective view of my invention, showing the change of direction in the slot of the guide-plate.

The nature of my invention consists in changing the direction of the slot in the guide-plate to an angle from a line running from one end, to the required distance from the other, for the purpose of enlarging the spindle at a point where it is most liable to break.

Instead of making a continuous straight slot in the guide-plate L for the traversing-cutter A, I change the direction at about four inches from the end, more or less, thereby forming an angle from the point B, whereby the cutter is guided to an increased angle with that of the spindle to be fitted.

In my former patent the angle of the spindle is the same from the small to the large end, the termination of which is found to be so abrupt that the spindle is liable to break at that point. I obviate this by increasing the size from the point B, as described.

What I claim, and desire to secure by Letters Patent, is—

The guide-plate L, constructed and operating as herein shown and described, for the purpose set forth.

CORNELIUS L. CAMPBELL.

Witnesses:
W. W. WHEATON,
S. W. SPALDING